United States Patent [19]

Bando et al.

[11] Patent Number: 4,743,826

[45] Date of Patent: May 10, 1988

[54] PUMPING-UP GENERATOR/MOTOR SYSTEM AND METHOD OF OPERATION OF THE SAME

[75] Inventors: Akira Bando; Kenichi Ono; Hiroshi Kashiwazaki; Hiroshi Sugisaka, all of Hitachi; Eiji Haraguchi, Ibarakai; Hiroto Nakagawa, Mishima, all of Japan

[73] Assignees: Hitachi, Ltd.; The Kansai Elect. Power Co., both of Japan

[21] Appl. No.: 852,742

[22] Filed: Apr. 16, 1986

[30] Foreign Application Priority Data

Apr. 17, 1985 [JP] Japan .................................. 60-80176

[51] Int. Cl.⁴ ............................................. H02P 7/42
[52] U.S. Cl. ..................................... 318/762; 307/87; 318/827; 417/44; 417/45
[58] Field of Search ............... 318/800, 778, 732, 827, 318/762; 363/71, 72, 160–165, 69, 70; 307/87, 82; 417/43–45

[56] References Cited

U.S. PATENT DOCUMENTS 4,009,431 2/1977 Johnson ................................. 363/69
4,481,455 11/1984 Sugimoto et al. ................... 318/827

OTHER PUBLICATIONS

Murphy, J. M. D., *Thyristor Control of A.C. Motors*, Pergamon Press, 1973, pp. 134–135.

*Primary Examiner*—David Smith, Jr.
*Attorney, Agent, or Firm*—Antonelli, Terry & Wands

[57] ABSTRACT

In a pumping-up generator/motor system comprising an induction generator/motor, at least one cyclo-converter connected to the secondary winding of the induction generator motor for controlling the rotational speed of the generator/motor in the motor mode and for maintaining the output frequency thereof in the generator mode at a constant level, the center of the speed range of the generator/motor in the generator mode is set near the synchronous speed thereof and a plurality of converter units constituting each cyclo-converter are connected in parallel in the generator mode, and in series in the motor mode thereby allowing the capacity of the cyclo-converter to be made smaller.

4 Claims, 3 Drawing Sheets

F I G. 1
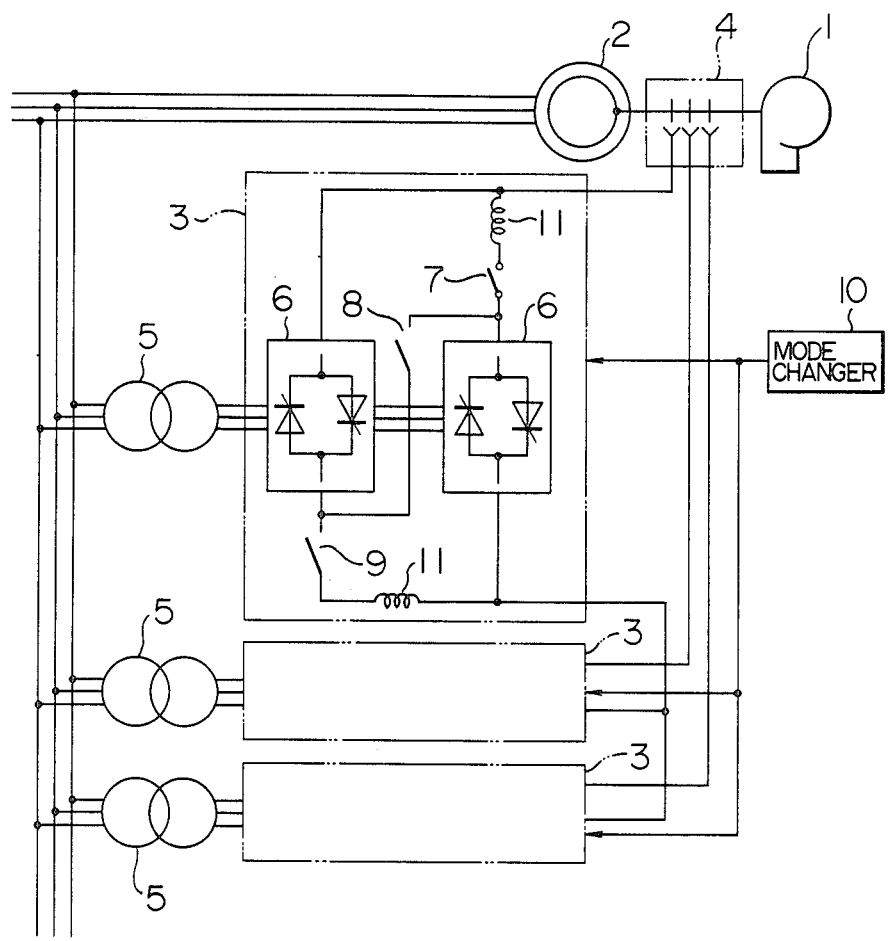

PUMPING-UP GENERATOR/MOTOR SYSTEM AND METHOD OF OPERATION OF THE SAME

BACKGROUND OF THE INVENTION

The present invention relates to a pumping-up generator/motor system for use with a pumping-up power plant, or more in particular to a pumping-up generator/motor system using a wound-rotor type induction machine.

Prior to explanation of a conventional method of operating a generator/motor system of this type such as a supersynchronous Scherbius system, explanation will be made about a system therefor. Such a system as disclosed in U.S. Pat. No. 4,481,455 issued to Sugimoto et al. on Nov. 6, 1984 includes a generator/motor 2 selectively driving a water turbine 1 as a load machine in a motor mode or driven by a prime mover in a generator mode as shown in FIG. 6. This generator/motor has a structure of a wound-rotor type induction machine with and its rotor is connected to cyclo-converters 3 through slip rings 4. Each cyclo-converter 3 is connected to a power line system through a transformer 5.

In operation thereof, each cyclo-converter is controlled, when the generator/motor is driven in a motor mode, so as to control the rotational speed of the motor and, when driven in a generator mode, so as to regulate the frequency of the generator output at a constant level regardless of the rotational speed of the generator.

In this configuration and operation, however, when the cyclo-converter is driven at a vicinity of its synchronous speed (where the slip is small), the polarity or direction of the current flowing in the cyclo-converter is changed at a relatively long time interval and hence the current of the cyclo-converter flows mainly through one side of the inverse-parallel connected rectifiers of the cyclo-converter. In order to prevent the cyclo-converter from being overheated, therefore, it is required to reduce the output of the generator/motor when it is driven at a vicinity of the synchronous speed where slip is small, or if it is desired not to reduce the output of the generator/motor, it is necessary to use a cyclo-converter of a large capacity.

In the pumping-up power plant, on the other hand, it is common practice to set the rated water flow rate in operation of the generator mode almost to the same value as that in operation of the motor mode, that is, pumping-up mode. In the case of a turbo machine typically such as a pump-turbine, the rotational speed $N_G$, at which the rated output in the power generation mode is produced at the maximum efficiency, is generally lower than the rotational speed $N_P$ at which the rated output in the pumping-up mode is produced. As a result, it is necessary that the speed range of the variable-speed type pumping-up generation system covers the rotational speeds $N_G$ and $N_P$.

Specifically, if the maximum efficiency of the water turbine is to be maintained in variation of its water head or output in the generator mode, it is necessary to maintain the speed variation in a vicinity of the rotational speed $N_G$. When the pumping-up output is controlled in the pumping-up mode for improving the stability of the power system, on the other hand, it is necessary to maintain the speed variation in a vicinity of the rotational speed $N_P$. Generally, the value $N_G$ or $N_P$ is set to a level approximate to the maximum speed in the control range of the water turbine in the generator mode pumping-up mode, respectively.

Now, the relationship between the speed control range and the rotational speed $N_G$ or $N_P$ will be explained more in detail with reference to FIGS. 2 and 3. In the case of a supersynchronous Scherbius system of variable-speed generator/motor, the required capacity of the converter units, such as thyristors, in inverse-parallel connection of a cyclo-converter is proportional to the maximum value Smax of the slip $S=(N_o-N/N_o,)$ where N is the rotating speed and No is the synchronous speed. If the required capacity of the thyristor elements is to be minimized, therefore, it is necessary to set the synchronous speed $N_o$ at a value between the maximum speed Nmax and the minimum speed Nmin in the desired speed range of the generator/motor as shown in FIG. 3 so that the maximum slip Smax becomes smallest with a speed range covering the maximum and minimum speeds Nmax and Nmin.

When a cyclo-converter is used and the generator/motor is driven in a vicinity of the synchronous speed, however, the output frequency of the cyclo-converter is very small near to a direct current, resulting in the necessity of either reducing the output of the generator/motor or increasing the capacity of the cyclo-converter as mentioned above.

For this reason, in another conventional method, the speed range is set below the synchronous speed in the generator mode as shown in FIG. 4. In this method, however, as compared with the arrangement of FIG. 2 assuming that the maximum slip set value Smax and the capacity of the converter elements are made the same, the speed control range in the generator mode is narrowed thereby to reduce the average efficiency.

A generator/motor of this type using a cyclo-converter is disclosed in "IEEE Transactions on Power Apparatus and Systems", Vol. PAS-100, No. 5, May 1981 (Pages 2171 to 2176) and Vol. PAS-99 No. 5, Sept/Oct 1980 (Pages 1828 to 1837).

SUMMARY OF THE INVENTION

The present invention has been developed in view of the above-mentioned facts, and it is an object thereof to provide a method of operation of a generator/motor of this type which is effective to improve the efficiency in the generator mode and to provide a wide speed control range in the motor operation mode, without increasing the capacity of the cyclo-converter.

According to the present invention, there is provided a method of operation of an induction generator/motor in which the center of the operating speed range of the generator/motor in the generator mode is set near the synchronous speed thereof, and a connection of a plurality of cyclo-converters is selectively changed such that, the cyclo-converters are connected in parallel to each other in the generator mode and in series in the motor mode.

BRIEF DESCRIPTION OF THE DRAWINGS

FIG. 1 is a system diagram showing a method of operation according to the present invention.

DESCRIPTION OF THE PREFERRED EMBODIMENTS

Figure 2:
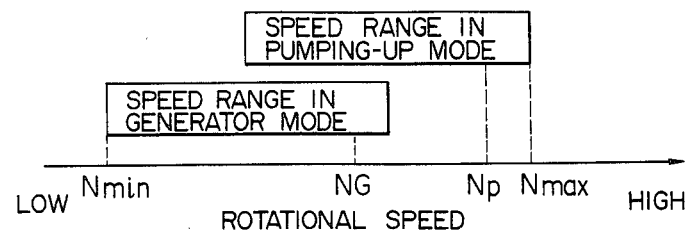
FIG. 2 is a diagram showing speed ranges in the generator mode and motor mode, respectively.

The present invention will be explained in detail with reference to an embodiment shown in the accompanying drawings.

In FIG. 1, a generator/motor 2 of a wound-rotor induction motor structure is connected to a water turbine 1 which acts as a prime mover in the generator mode and a load in the motor mode. Each cyclo-converter 3 is supplied with a commercial frequency reduced or boosted through a transformer 5 from the power system, converts it into a slip frequency, and supplies the converted frequency to the rotor winding of the generator/motor 2 through a slip ring 4. The cyclo-converter 3 includes a plurality of bridge-connection converter units 6 of the same specification.

Further, the cyclo-converter 3 includes switches 7, 8 and 9 which are closed or opened by control of a switch changer 10 depending on the operation mode of the converter 3. In the motor operation mode, the switches 7 and 9 are opened and the switch 8 is closed. As a result, the voltage capacity, of the converter is a multiple of the number of the converter units 6 connected in series. It is therefore possible to drive the motor with a slip larger than with a single bridge. In the generator mode, on the other hand, the switches 7 and 9 are closed, while the switch 8 is opened. In this case, reactors 11 are provided to reduce a circulating current through the parallel-connected converter units 6. Alternatively, however, the connection to the transformer 5 may be switched to a lower voltage tap provided in the low-voltage winding (not shown) of the transformer 5. The value of the output voltage is set to about the rated voltage for motor operation divided by the number of the parallel-connected converter units. In this way, the current capacity of the frequency converter 3 is multiplied by the number of parallel-connected units, thereby enabling the generator to be driven at about the synchronous speed. Also, according to the present invention, the center of the speed range of the water turbine in the generator mode is set to about the synchronous speed, and the maximum slip Smax (G) in the generator mode is set to be almost the same as the maximum slip Smax (D) in the motor or pumping-up mode divided by the number $N_P$ of parallel-connected converter units, i.e. Smax (G)=$(1/N_P)$Smax (P). Since the voltage rating of the cyclo converter is proportional to the maximum slip, the voltage rating of the cyclo-converter can be lower in the generator mode than in the motor mode. As a consequence, by connecting a plurality of converter units in parallel, the current capacity is increased, thereby making it possible to drive the generator near the synchronous speed. In the motor mode, on the other hand, the converter units are connected in series and the center of the operating speed range is made higher than the synchronous speed. The present invention provides meritorious effects mentioned below.

Figure 3:
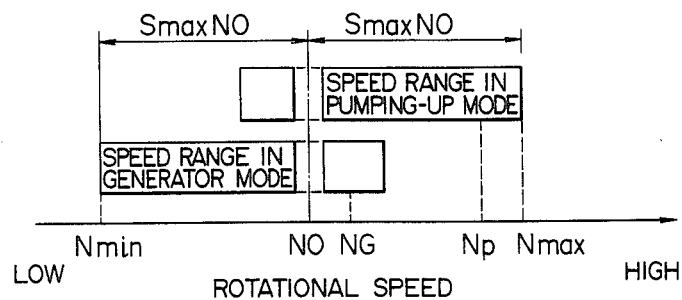
FIG. 3 is a diagram showing the relationship between the speed ranges and the synchronous speed.
Figure 4:
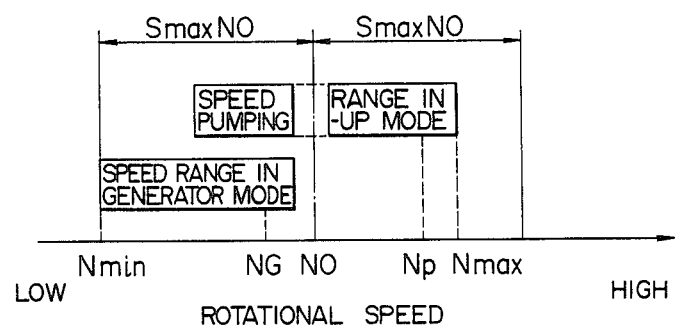
FIG. 4 is a diagram showing an operation range for a conventional system.
Figure 5:
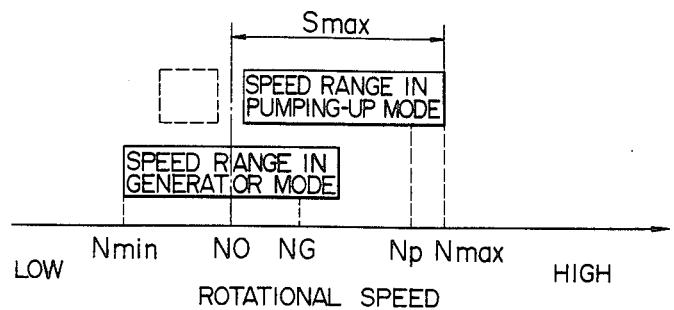
FIG. 5 is a diagram showing an operation range according to the present invention.
Figure 6:
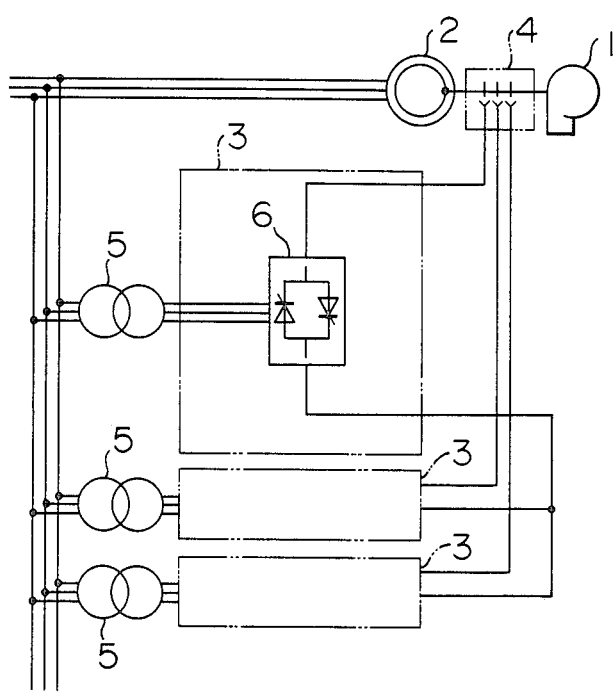
FIG. 6 is a system diagram for explaining a method of operation according to the prior art.

First, when the maximum slip in the pumping-up mode is selected to be the same as that in FIG. 3 or 4, it is possible to set a large margin of output regulation about the synchronous speed, thus reducing the effect in operable speed range around the synchronous speed. This is due to the fact that the speed range in the motor mode can be increased as the speed at the rated output in the generator mode is increased.

Secondly, unlike in the case of FIG. 4, it is possible to use a large speed range in the generator mode thereby improving the partial load efficiency of the water turbine without inviting any inoperable range near the synchronous speed at the center of the speed range in the pumping-up mode.

It will thus be understood from the foregoing description that according to the present invention there is provided a method of operation of an induction type generator/motor in which the center of its operating speed range in the generator mode is set near the synchronous speed, and a connection of a plurality of converter units constituting each cyclo-converter is selectively changed such that the converter units are connected in parallel in the generator mode and in series in the motor mode. In this way, the current capacity of the cyclo-converter is increased in the generator mode, while the voltage capacity is increased in the motor mode, so that it is possible to achieve the maximum water turbine efficiency in the generator mode and the maximum output range in the pumping-up mode without increasing the capacity of the converter units.

We claim:

1. A pumping-up generator/motor system comprising a water turbine, a wound-rotor induction generator/motor means connected to said water turbine, said generator/motor means being selectively drivable in a generator motor or a motor mode with a center of operating speed range of the generator/motor means in the generator mode being set near its synchronous speed and the center of the operating speed range in the motor mode being set substantially higher than the synchronous speed, at least one cyclo-converter including a plurality of converter units and connected to a secondary winding of said generator/motor means for controlling a rotational speed of the generator/motor means driven in the motor mode and an output frequency of the generator/motor means driven in the generator mode, and a mode changer for selectively changing the connection of the converter units of each cyclo-converter such that said converter units are connected in parallel to each other in the generator mode and in series in the motor mode.

2. In a pumping-up generator/motor system comprising a water turbine, a wound-rotor induction generator/motor means connected to said water turbine, and at least one cyclo-converter connected to a secondary winding of said generator/motor means for controlling a rotational speed of the generator/motor means driven in the motor mode and an output frequency of the generator/motor means driven in a generator mode, a method of operation of said generator/motor system comprising setting a center of operating speed range of the generator/motor means in the generator mode near its synchronous speed while setting the center of the operating speed range in the motor mode substantially higher than the synchronous speed, and selectively connecting a plurality of converter units constituting each cyclo-converter in parallel to each other in the generator mode and in series in the motor mode.

3. A method according to claim 2, further comprising, making a power voltage supplied to each cyclo-converter lower in the generator mode than in the motor mode.

4. A method according to claim 3, wherein the voltage supplied to the cyclo-converter in the generator mode is substantially equal to the rated voltage supplied thereto in the motor mode divided by the number of the converter units connected in parallel.

* * * * *